United States Patent
Stamps et al.

(10) Patent No.: US 11,440,649 B2
(45) Date of Patent: *Sep. 13, 2022

(54) ASSISTED LANDING SYSTEMS FOR ROTORCRAFT

(71) Applicant: Textron Innovations Inc., Providence, RI (US)

(72) Inventors: Frank Bradley Stamps, Colleyville, TX (US); Michael K. McNair, Weatherford, TX (US); John Richard McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/134,378

(22) Filed: Dec. 26, 2020

(65) Prior Publication Data

US 2021/0114719 A1 Apr. 22, 2021

Related U.S. Application Data

(63) Continuation of application No. 15/982,420, filed on May 17, 2018, now Pat. No. 10,906,637.

(51) Int. Cl.

| | |
|---|---|
| *B64C 27/00* | (2006.01) |
| *B64D 27/10* | (2006.01) |
| *B64C 27/08* | (2006.01) |
| *B64D 27/24* | (2006.01) |
| *B64C 29/00* | (2006.01) |
| *B64D 27/02* | (2006.01) |

(52) U.S. Cl.
CPC ............ *B64C 27/006* (2013.01); *B64C 27/08* (2013.01); *B64D 27/10* (2013.01); *B64D 27/24* (2013.01); *B64C 29/0033* (2013.01); *B64D 2027/026* (2013.01)

(58) Field of Classification Search
CPC ...................................................... B64D 35/08
See application file for complete search history.

(56) References Cited

U.S. PATENT DOCUMENTS

| | | | |
|---|---|---|---|
| 9,180,964 | B2 | 11/2015 | Smith et al. |
| 9,193,450 | B2 | 11/2015 | Worsham et al. |
| 9,522,730 | B2 | 12/2016 | Smith et al. |
| 9,821,908 | B2 | 11/2017 | Schaeffer et al. |
| 10,450,080 | B1 | 10/2019 | Beach |
| 2003/0094537 | A1 | 5/2003 | Austen-Brown |
| 2007/0057113 | A1 | 3/2007 | Parks |
| 2008/0006739 | A1 | 1/2008 | Mochida et al. |
| 2009/0145998 | A1 | 6/2009 | Salyer |
| 2011/0024555 | A1 | 2/2011 | Kuhn, Jr. |
| 2011/0108663 | A1 | 5/2011 | Westenberger |

(Continued)

*Primary Examiner* — Vivek D Koppikar
*Assistant Examiner* — Andrew James Trettel
(74) *Attorney, Agent, or Firm* — Lawrence Youst PLLC

(57) ABSTRACT

A propulsion assembly for a rotorcraft includes a blade assembly, a drive shaft coupled to the blade assembly and an electric motor coupled to the drive shaft and operable to provide rotational energy to the drive shaft to rotate the blade assembly. The propulsion assembly includes a landing assistance turbine coupled to the drive shaft and operable to selectively provide rotational energy to the drive shaft during an underpowered descent to rotate the blade assembly and provide upward thrust, thereby reducing a descent rate of the rotorcraft prior to landing.

20 Claims, 9 Drawing Sheets

(56) References Cited

U.S. PATENT DOCUMENTS

| | | | |
|---|---|---|---|
| 2014/0010652 A1* | 1/2014 | Suntharalingam | B64D 27/02 475/5 |
| 2014/0346283 A1 | 11/2014 | Salyer | |
| 2016/0207625 A1 | 7/2016 | Judas et al. | |
| 2016/0355272 A1 | 12/2016 | Moxon | |
| 2017/0225794 A1 | 8/2017 | Waltner | |
| 2017/0240274 A1 | 8/2017 | Regev | |
| 2017/0305541 A1 | 10/2017 | Vallart et al. | |
| 2017/0320584 A1 | 11/2017 | Menheere | |
| 2018/0079516 A1 | 3/2018 | Phan et al. | |
| 2018/0244384 A1 | 8/2018 | Phan et al. | |
| 2018/0265213 A1 | 9/2018 | Himmelmann | |
| 2018/0362169 A1 | 12/2018 | Du | |
| 2019/0011934 A1 | 1/2019 | DeBitetto et al. | |
| 2019/0023389 A1 | 1/2019 | Murrow et al. | |
| 2019/0100322 A1 | 4/2019 | Schank | |
| 2019/0291859 A1 | 9/2019 | Manning | |
| 2019/0322382 A1 | 10/2019 | Mackin | |
| 2019/0375495 A1 | 12/2019 | Pfammatter et al. | |
| 2020/0115062 A1 | 4/2020 | Klonowski et al. | |
| 2020/0148376 A1 | 5/2020 | Kawai | |
| 2020/0156801 A1 | 5/2020 | Tamada | |
| 2020/0262574 A1 | 8/2020 | Peleg | |
| 2020/0290742 A1 | 9/2020 | Kumar et al. | |

\* cited by examiner

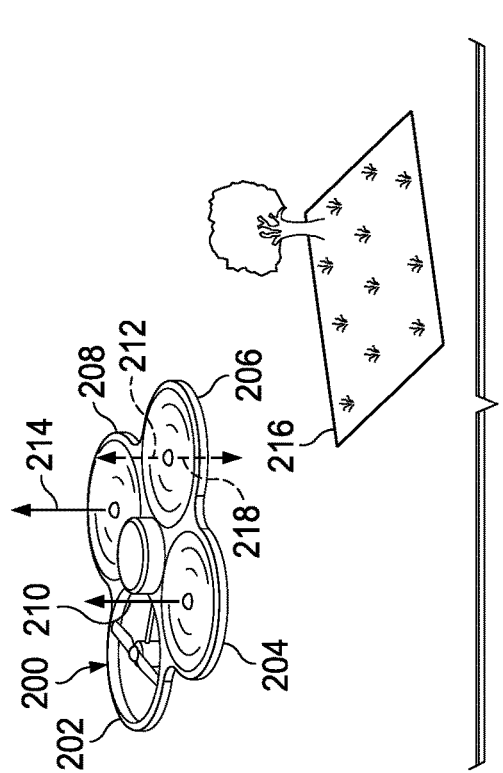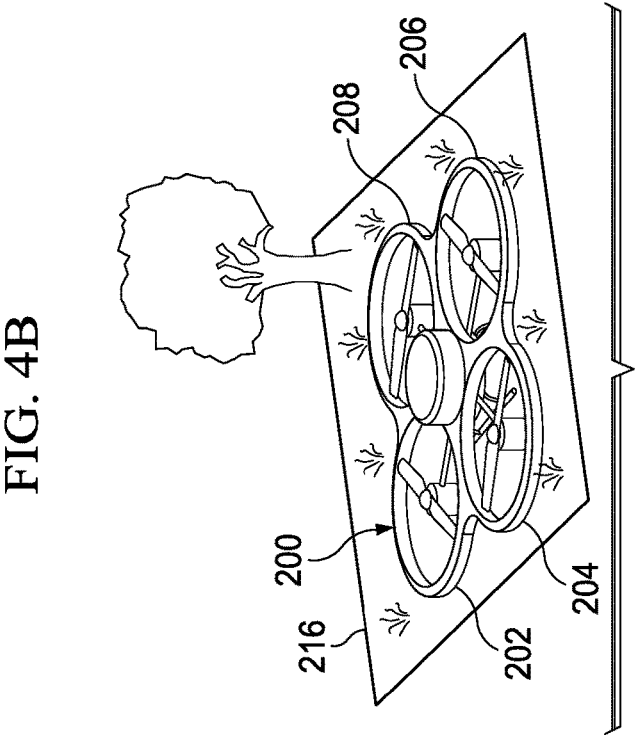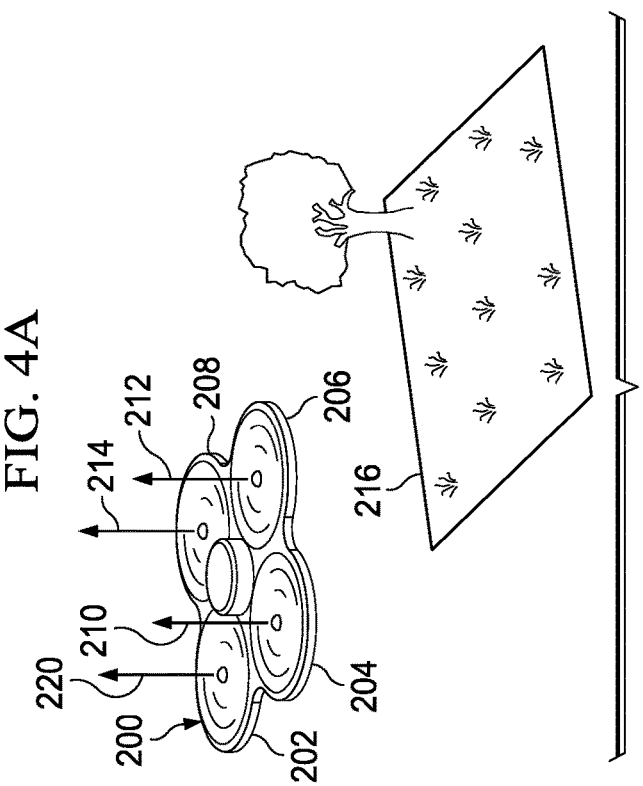

ASSISTED LANDING SYSTEMS FOR ROTORCRAFT

CROSS-REFERENCE TO RELATED APPLICATIONS

The present application is a continuation of application Ser. No. 15/982,420 filed May 17, 2018.

TECHNICAL FIELD OF THE DISCLOSURE

The present disclosure relates, in general, to assisted landing systems operable for use on rotorcraft and, in particular, to assisted landing systems including a landing assistance propulsion unit that provides upward thrust during an underpowered descent of a rotorcraft, thereby reducing the descent rate of the rotorcraft prior to landing.

BACKGROUND

In some countries rotorcraft are classified into various categories according to size and other factors and are subject to airworthiness requirements based on this classification. Examples include "Category A" and "Category B" classifications for rotorcraft set forth by the United States Federal Aviation Administration. To meet these requirements and/or improve general safety, it is desirable for rotorcraft to be capable of reducing their descent rates to an acceptable level upon experiencing an engine or motor malfunction. One method of reducing descent rate is autorotation of the main rotor system of a helicopter using the aerodynamic force of the air moving up through the rotor system to rotate the rotor system. Upon final approach during an autorotation landing, the helicopter performs a flare recovery maneuver in which the kinetic energy of the rotor is converted into lift using aft cyclic control while maintaining heading using the helicopter's antitorque pedals. A flare recovery maneuver is typically performed just before touchdown, but the altitude at which to perform the maneuver depends on many factors, including the helicopter model, the descent rate, the airspeed, the headwind component and how rapidly the pilot moves the cyclic control.

Not all rotorcraft, however, are capable of performing autorotation or flare recovery maneuvers. For example, a rotorcraft having fixed pitch fan blades or lacking cyclic control cannot execute the aft cyclic control required in a flare recovery maneuver. Also, multirotor aircraft having variable pitch rotor blades may be unable to store enough kinetic energy to slow the descent rate of the rotorcraft in a flare recovery maneuver. Accordingly, a need has arisen for assisted landing systems that assist rotorcraft with or without autorotation capability in landing safely after an engine or motor malfunction without adding undue weight to the rotorcraft.

SUMMARY

In a first aspect, the present disclosure is directed to a propulsion assembly for a rotorcraft including a blade assembly, a drive shaft coupled to the blade assembly and an electric motor coupled to the drive shaft and operable to provide rotational energy to the drive shaft to rotate the blade assembly. The propulsion assembly includes a landing assistance turbine coupled to the drive shaft and operable to selectively provide rotational energy to the drive shaft during an underpowered descent to rotate the blade assembly and provide upward thrust, thereby reducing a descent rate of the rotorcraft prior to landing.

In some embodiments, the blade assembly may be a fan blade assembly including a plurality of fixed pitch fan blades. In other embodiments, the blade assembly may be a rotor blade assembly including a plurality of variable pitch rotor blades. In such embodiments, the pitch of the variable pitch rotor blades may be cyclically or collectively variable. In certain embodiments, the electric motor may be interposed between the blade assembly and the landing assistance turbine such that the electric motor and the landing assistance turbine form a stacked arrangement. In some embodiments, the landing assistance turbine may be activated during a descent rate reduction maneuver within 100 feet from the ground. In certain embodiments, the landing assistance turbine may be a single use landing assistance turbine. In some embodiments, the landing assistance turbine may be adapted to provide upward thrust for a duration between about 1 and about 10 seconds.

In certain embodiments, the drive shaft may include a clutch, such as a one-way clutch, a sprag clutch or an overrunning clutch, interposed between the electric motor and the landing assistance turbine. In some embodiments, the landing assistance turbine may be a solid fuel turbine, which may include a solid fuel chamber adapted to contain a solid fuel and an oxidant chamber adapted to contain an oxidant. In certain embodiments, the solid fuel may include rubber and the oxidant may include nitrogen and oxygen. In some embodiments, the oxidant chamber may be a nitrogen dioxide canister. In certain embodiments, the solid fuel and the oxidant may be replaceable after use. In some embodiments, the solid fuel turbine may be a controllable speed turbine including a throttle and the throttle may be operable to selectively release oxidant for combustion with the solid fuel, thereby selectively controlling the upward thrust. In certain embodiments, the throttle may be operable to vary the release of oxidant in response to input from a flight control computer or a pilot of the rotorcraft. In some embodiments, the underpowered descent of the rotorcraft may be caused by a full or partial failure of the electric motor. In certain embodiments, the landing assistance turbine may include a combustion chamber to contain a combustion reaction and an exhaust subsystem to release the exhaust produced by the combustion reaction. In some embodiments, the propulsion assembly may include a nacelle fully or partially containing the drive shaft, the electric motor and the landing assistance turbine.

In a second aspect, the present disclosure is directed to a rotorcraft including a fuselage and a plurality of propulsion assemblies coupled to the fuselage. Each propulsion assembly includes a blade assembly, a drive shaft coupled to the blade assembly and an electric motor coupled to the drive shaft and operable to provide rotational energy to the drive shaft to rotate the blade assembly. Each propulsion assembly also includes a landing assistance turbine coupled to the drive shaft and operable to selectively provide rotational energy to the drive shaft during an underpowered descent to rotate the blade assembly and provide upward thrust, thereby reducing a descent rate of the rotorcraft prior to landing.

In some embodiments, at least one of the propulsion assemblies may be subject to a malfunction caused by a failure of its electric motor. In such embodiments, the non-malfunctioning propulsion assemblies may provide upward thrust during the underpowered descent and the landing assistance turbine of the malfunctioning propulsion assembly may provide upward thrust during a descent rate reduction maneuver prior to landing to safely land the rotorcraft. In certain embodiments, the rotorcraft may be a quadcopter and the plurality of propulsion assemblies may include four fan assemblies. In some embodiments, the rotorcraft may include a closed wing coupled to the fuselage and the plurality of propulsion assemblies may be coupled to the closed wing.

In certain embodiments, the rotorcraft may include one or more wings supported by the fuselage and the plurality of propulsion assemblies may be coupled to the wing(s). In some embodiments, the rotorcraft may be a tiltrotor aircraft including a first wing. In such embodiments, the plurality of propulsion assemblies may include first and second pylon assemblies each rotatably coupled to a respective outboard end of the first wing. In certain embodiments, the tiltrotor aircraft may include a second wing aft of the first wing. In such embodiments, the plurality of propulsion assemblies may include third and fourth pylon assemblies each rotatably coupled to a respective outboard end of the second wing. In some embodiments, the rotorcraft may include a flight control computer in communication with the landing assistance turbine and the flight control computer may be operable to control the upward thrust of the landing assistance turbine. In certain embodiments, the landing assistance turbine may include a throttle in communication with the flight control computer and the throttle may be operable to control the upward thrust of the landing assistance turbine.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4D are schematic illustrations of a quadcopter in a sequential landing operation scenario in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
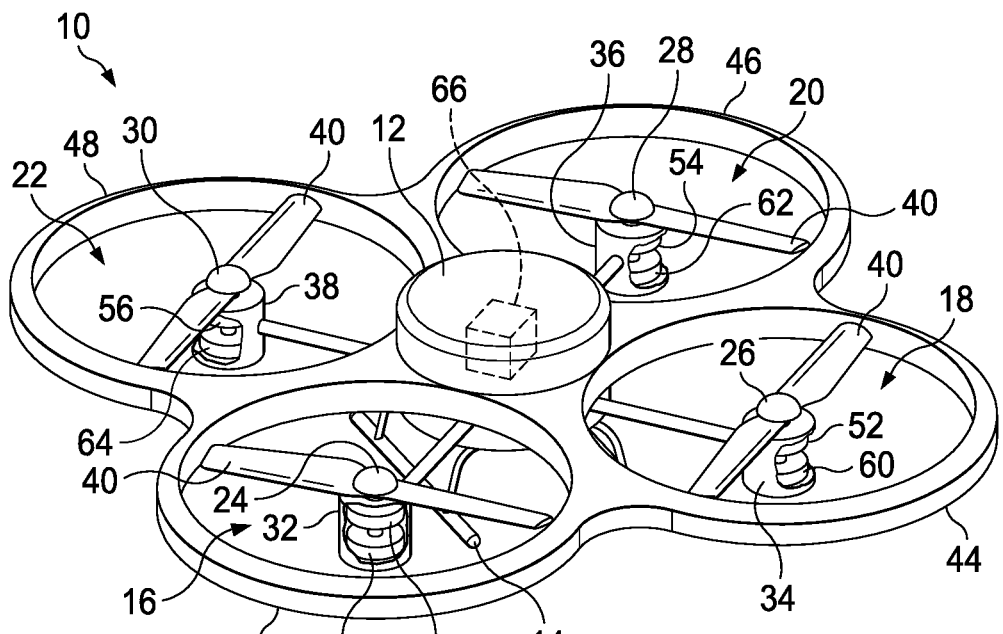
FIGS. 1A-1B are schematic illustrations of a quadcopter having an assisted landing system in accordance with embodiments of the present disclosure.
Figure 1B:
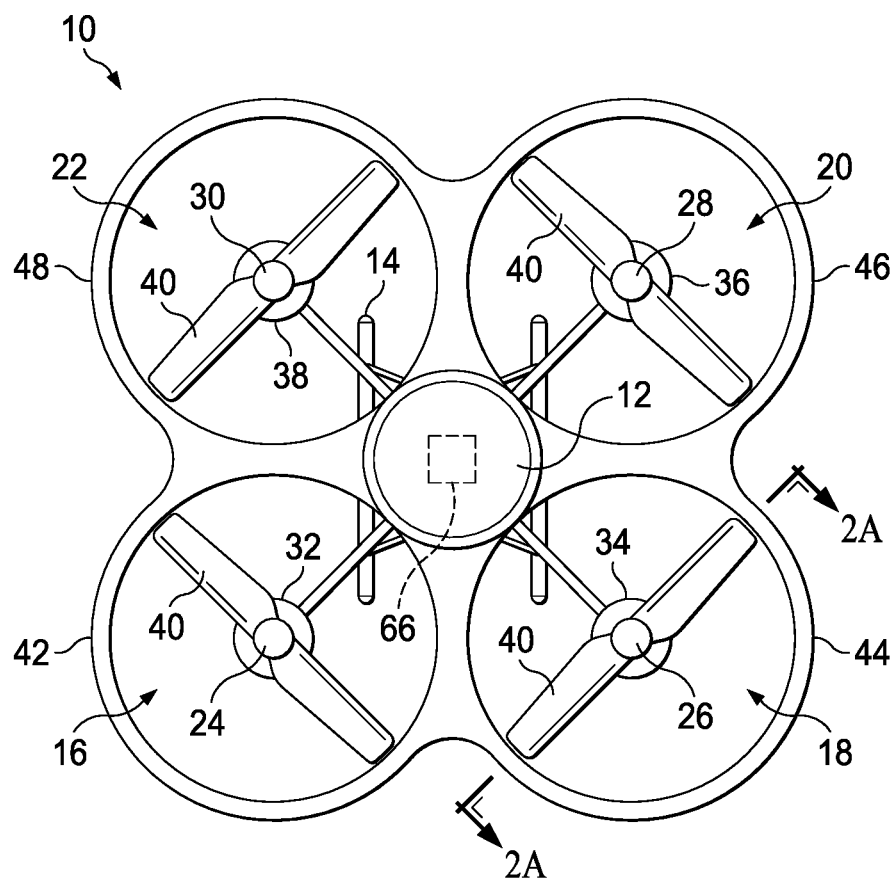

Referring to FIGS. 1A-1B in the drawings, a quadcopter having an assisted landing system is schematically illustrated and generally designated 10. Quadcopter 10 includes a fuselage 12, which can carry cargo, passengers or a combination thereof. Landing skids 14 provide ground support for quadcopter 10. Quadcopter 10 includes four fan assemblies 16, 18, 20, 22 coupled to fuselage 12. Fan assemblies 16, 18, 20, 22 are radially symmetric about fuselage 12. Each fan assembly 16, 18, 20, 22 includes a respective fan blade assembly 24, 26, 28, 30 rotatably coupled to a nacelle 32, 34, 36, 38. While each fan blade assembly 24, 26, 28, 30 includes two fan blades 40, it should be understood by those having ordinary skill in the art that fan blade assemblies 24, 26, 28, 30 could alternatively have a different number of fan blades. Fan blades 40 are fixed pitch fan blades, although in other embodiments fan blades 40 may be variable pitch fan blades having collective and/or cyclic control. Each fan assembly 16, 18, 20, 22 includes a protective shroud 42, 44, 46, 48, which protects fan blade assemblies 24, 26, 28, 30 from contact with surrounding objects. Shrouds 42, 44, 46, 48 may also reduce tip and efficiency losses and increase thrust performance. Quadcopter 10 may be any size or weight based on many factors, such as desired payload or intended functionality.

Each nacelle 32, 34, 36, 38 includes an electric motor 50, 52, 54, 56 that provides rotational energy to rotate fan blade assemblies 24, 26, 28, 30, respectively. Should one of fan assemblies 16, 18, 20, 22 malfunction due to the full or partial failure of its electric motor 50, 52, 54, 56, quadcopter 10 may be forced to make an emergency landing while experiencing an underpowered descent. In an underpowered descent, insufficient propulsion power is available to perform a safe landing due to a motor failure or other malfunction. In some cases, quadcopter 10 may experience a high rate descent exceeding the ideal descent rate for a safe landing. To prevent a high impact landing from occurring, each nacelle 32, 34, 36, 38 includes a landing assistance propulsion unit 58, 60, 62, 64. Each landing assistance propulsion unit 58, 60, 62, 64 may selectively provide upward thrust during the underpowered descent to reduce the descent rate of quadcopter 10 prior to landing. Landing assistance propulsion units 58, 60, 62, 64 are aft of electric motors 50, 52, 54, 56, respectively, although landing assistance propulsion units 58, 60, 62, 64 and electric motors 50, 52, 54, 56 may be in any spatial relationship relative to one another. A flight control computer 66 may be in communication with landing assistance propulsion units 58, 60, 62, 64 to control the upward thrust produced by each landing assistance propulsion unit 58, 60, 62, 64.

To illustrate the operation of the assisted landing system of quadcopter 10, assume that fan assembly 16 malfunctions due to the failure of electric motor 50, causing quadcopter 10 to experience an underpowered and high rate descent. Although fan assemblies 18, 20, 22 are still functional, their collective upward thrust may be insufficient to land safely. Prior to the final landing approach, fan assemblies 18 and 22, which are off-axis from malfunctioning fan assembly 16, may be used to provide most of the upward thrust during descent while fan assembly 20, which is on-axis with malfunctioning fan assembly 16, may be used to balance quadcopter 10 to prevent a rollover. A descent rate reduction maneuver may be performed during the final landing approach in which landing assistance propulsion unit 58 of malfunctioning fan assembly 16 is engaged and rotates fan blade assembly 24 to produce an upward thrust that is balanced by the upward thrusts produced by electric motors 52, 54, 56 of fan assemblies 18, 20, 22. Thus, all four fan assemblies 16, 18, 20, 22 may exert upward thrusts that soften the landing of quadcopter 10 despite the failure of electric motor 50.

The descent rate reduction maneuver performed using landing assistance propulsion unit 58 is analogous to a flare recovery maneuver performed by a helicopter during autorotation in that the descent rate reduction maneuver reduces the descent rate of quadcopter 10 just prior to landing on the ground. Multirotor aircraft, such as quadcopter 10, may lack sufficient rotational inertia in any one of its rotors to perform autorotation. Landing assistance propulsion units 58, 60, 62, 64 compensate for this lack of rotational inertia by providing an upward thrust that balances the moments exerted upon quadcopter 10 and lowers the descent rate to allow for a safe landing. In some embodiments, landing assistance propulsion units 58, 60, 62, 64 may each be a backup short duration solid fuel-powered turbine in each fan assembly 16, 18, 20, 22 that provides torque and rotational energy when an electric motor 50, 52, 54, 56 fails, respectively. In other embodiments, electric motors 50, 52, 54, 56 may instead be internal combustion engines.

It should be appreciated that quadcopter 10 is merely illustrative of a variety of aircraft that can implement the embodiments disclosed herein. Indeed, the assisted landing system, including landing assistance propulsion units 58, 60, 62, 64, may be utilized on any rotorcraft. Other aircraft implementations can include tiltrotor aircraft, hybrid aircraft, compound aircraft, tiltwing aircraft, quad tiltrotor aircraft, helicopters, propeller airplanes and the like. As such, those skilled in the art will recognize that the assisted landing system disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2A:
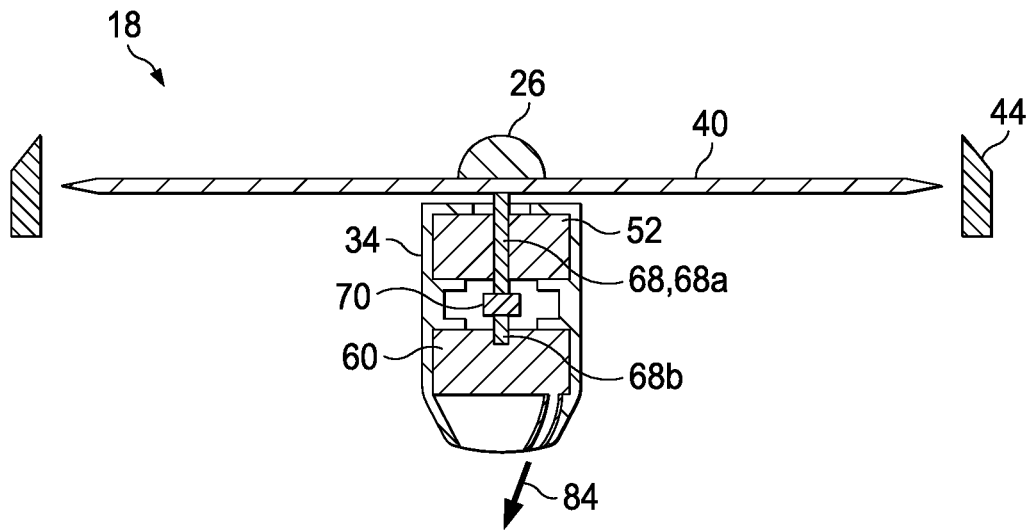
FIGS. 2A-2B are various views of a fan assembly for a quadcopter in accordance with embodiments of the present disclosure.
Figure 2B:
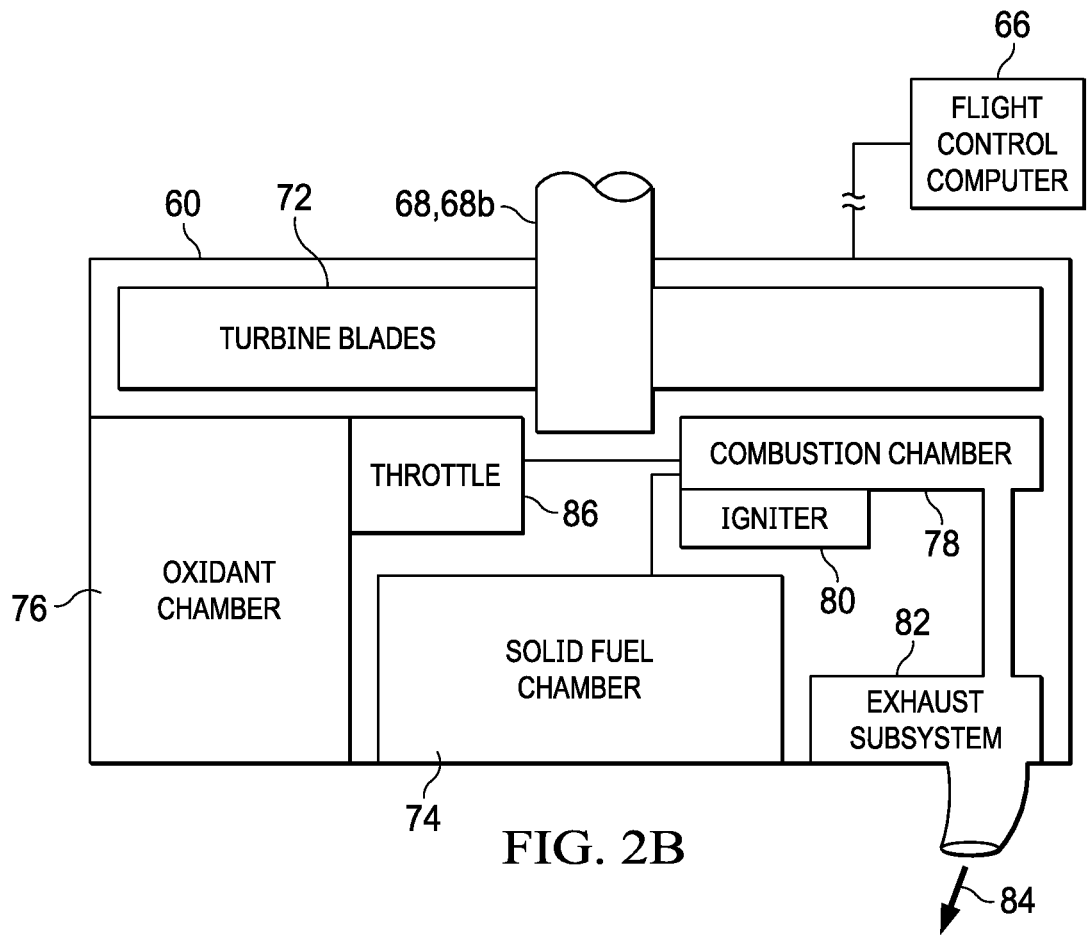

Referring to FIGS. 2A-2B in the drawings, various views of fan assembly 18 of quadcopter 10 are schematically illustrated. Fan assembly 18 is substantially similar to fan assemblies 16, 20, 22 in FIGS. 1A-1B, therefore, for sake of efficiency, certain features will be disclosed only with regard to fan assembly 18. One having ordinary skill in the art, however, will fully appreciate an understanding of fan assemblies 16, 20, 22 based upon the disclosure herein of fan assembly 18. As best seen in FIG. 2A, which is a cross-sectional view of fan assembly 18 taken along line 2A-2A in FIG. 1B, nacelle 34 contains, or encases, electric motor 52, landing assistance propulsion unit 60 and a drive shaft 68. Electric motor 52 is coupled to drive shaft 68 and provides rotational energy to drive shaft 68 to rotate fan blade assembly 26, which is encircled by shroud 44. Landing assistance propulsion unit 60 is a turbine coupled to drive shaft 68 that selectively provides rotational energy to driveshaft 68 to rotate fan blade assembly 26 during an underpowered descent or when electric motor 52 fails. Electric motor 52 is interposed between fan blade assembly 26 and landing assistance propulsion unit 60 such that electric motor 52 and landing assistance propulsion unit 60 form a stacked arrangement, although other arrangements are also possible.

Driveshaft 68 includes a clutch depicted as one way clutch 70 interposed between electric motor 52 and landing assistance propulsion unit 60 to isolate landing assistance propulsion unit 60 until it is engaged. One way clutch 70 allows upper portion 68a of driveshaft 68 to freewheel with respect to lower portion 68b of driveshaft 68 so that electric motor 52 can rotate upper portion 68a of driveshaft 68 regardless of whether landing assistance propulsion unit 60 is outputting power. Thus, upper portion 68a of driveshaft 68 may be rotated by electric motor 52 while lower portion 68b of driveshaft 68 remains stationary. If electric motor 52 fails and can no longer rotate upper portion 68a of driveshaft 68, landing assistance propulsion unit 60 provides rotational energy to lower portion 68b of driveshaft 68, thereby rotating both upper portion 68a of driveshaft 68 and fan blade assembly 26. Non-limiting examples of one way clutch 70 include a sprag clutch, a slip clutch, a one way freewheel clutch, an overrunning clutch or other suitable clutch type. In other embodiments, instead of using one way clutch 70, landing assistance propulsion unit 60 may engage to force lower portion 68b of driveshaft 68 into a gear that enables landing assistance propulsion unit 60 to provide rotational energy to upper portion 68a of driveshaft 68 and fan blade assembly 26, similar to the gear system used in some starter motors.

In some embodiments, fan blade assembly 26 may be able to freewheel, or spin freely, when electric motor 52 fails. In many cases, electric motors freewheel after failure even though their coils have burned and cannot provide power. To ensure such a freewheel relationship between fan blade assembly 26 and electric motor 52, however, a one way clutch may be interposed between fan blade assembly 26 and electric motor 52 to allow fan blade assembly 26 to freewheel in case electric motor 52 jams. The one way clutch may thus isolate electric motor 52 if it fails in such a way that it does not allow upper portion 68a of driveshaft 68 to freewheel.

Referring to FIG. 2B, landing assistance propulsion unit 60 includes turbine blades 72 coupled to drive shaft 68. Landing assistance propulsion unit 60 is a solid fuel turbine that includes a solid fuel chamber 74 adapted to contain a solid fuel and an oxidant chamber 76 adapted to contain an oxidant. Solid fuel chamber 74 may include any type of solid fuel, such as ground rubber. Oxidant chamber 76 may include any type of oxidant, such as oxidants that include both nitrogen and oxygen. For example, oxidant chamber 76 may contain nitrogen dioxide. In some embodiments, solid fuel chamber 74 and oxidant chamber 76 may be replaceable cartridges that allow landing assistance propulsion unit 60 to be refueled after each use. For example, oxidant chamber 76 may be a nitrogen dioxide canister that may be removed and inserted into landing assistance propulsion unit 60. Any amount of solid fuel and oxidant may be included in solid fuel chamber 74 and oxidant chamber 76, respectively. The amount of solid fuel and oxidant included in solid fuel chamber 74 and oxidant chamber 76 may be determined based on the amount of time that upward thrust is required of landing assistance propulsion unit 60. For example, the supply of solid fuel and oxidant housed by landing assistance propulsion unit 60 may be adequate to provide upward thrust for a duration between 1 and 10 seconds. More solid fuel and oxidant may be housed by landing assistance propulsion unit 60 if longer durations of upward thrust are required.

Landing assistance propulsion unit 60 includes a combustion chamber 78 adapted to contain a combustion reaction between solid fuel from solid fuel chamber 74 and oxidant from oxidant chamber 76 to rotate turbine blades 72 and drive shaft 68. In some embodiments, an igniter 80 may facilitate the combustion reaction. In other embodiments, the combustion reaction may occur in landing assistance propulsion unit 60 without the need for combustion chamber 78. Landing assistance propulsion unit 60 also includes an exhaust subsystem 82 that releases exhaust 84 produced by the combustion reaction in combustion chamber 78. In some embodiments, landing assistance propulsion unit 60 may include a throttle 86 to control the upward thrust produced by landing assistance propulsion unit 60. In particular, throttle 86 may selectively release oxidant from oxidant chamber 76 for combustion with solid fuel in combustion chamber 78, thereby controlling the speed of turbine blades 72 and the upward thrust of fan assembly 18. In one example, throttle 86 may rapidly switch on or off the flow of oxidant, such as nitrogen dioxide gas, delivered to the solid fuel in combustion chamber 78 to control the burn rate, revolutions per minute (RPM), rotational speed and torque generated by landing assistance propulsion unit 60. In some embodiments, throttle 86 may be a centrifugally actuated governor valve that automates the release of oxidant and prevents overspeed. Throttle 86 may vary the release of oxidant in response to input, or commands, from flight control computer 66, which is in communication with throttle 86. In other embodiments, throttle 86 may vary the release of oxidant in response to input from a pilot of the rotorcraft or from elsewhere.

In the illustrated embodiment, fan assembly 18 includes fixed pitch fan blades 40, and thus the upward thrust generated by fan assembly 18 may be varied by changing the RPM of fan blade assembly 26 using throttle 86. In other embodiments in which fan blades 40 are variable pitch blades, the pitch of fan blades 40 may be adjusted to vary the upward thrust of fan assembly 18 instead of or in addition to using throttle 86. It will be appreciated by one of ordinary skill in the art that the components of landing assistance propulsion unit 60 are illustrated as a block diagram in FIG. 2B for ease of reference, and that the size, position and identity of the components therein may differ depending on the embodiment. The solid fuel turbine represented by landing assistance propulsion unit 60 may advantageously be lighter than an additional electric motor stacked behind electric motor 52, and may eliminate the need for a battery, which can add excess weight to the rotorcraft. In some embodiments, landing assistance propulsion unit 60 may be single use, disposable and/or replaceable. For example, turbine blades 72 may be manufactured to be suitable for a single use that burns turbine blades 72 away. In other embodiments, turbine blades 72 may be powered by a liquid or gas fuel, such as propane, instead of solid fuel. In yet other embodiments, fan assembly 18 may include a backup electric motor, in lieu of landing assistance propulsion unit 60, powered by a surge fuel cell or surge battery. The surge fuel cell may provide a time-limited chemical reaction that powers the backup electric motor on the order of seconds to provide thrust assistance during landing.

Figure 3:
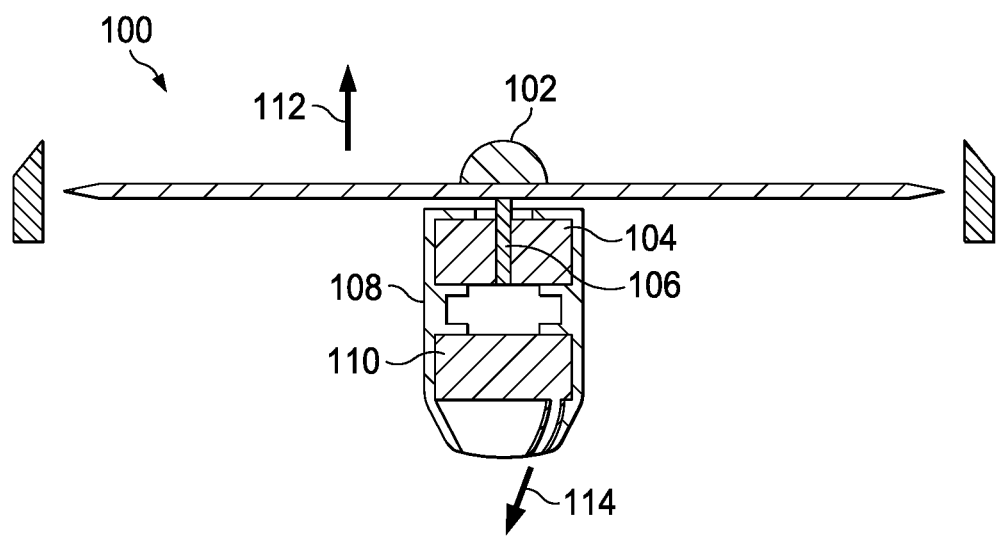
FIG. 3 is a cross-sectional view of a fan assembly for a quadcopter in accordance with embodiments of the present disclosure.

Referring to FIG. 3 in the drawings, a fan assembly of an assisted landing system is schematically illustrated and generally designated 100. Fan assembly 100 includes fan blade assembly 102 rotated by electric motor 104 via drive shaft 106. In addition to electric motor 104 and drive shaft 106, nacelle 108 includes a landing assistance rocket 110. Landing assistance rocket 110 imparts upward thrust 112 to fan assembly 100 by the forceful emission of exhaust 114, and thus does not directly rotate driveshaft 106 as in the case of the turbine described in FIGS. 2A-2B. Landing assistance rocket 110 may be any type of rocket, such as a chemical-based rocket, solid propellant rocket, liquid-fueled rocket or gas-fueled rocket. In one non-limiting example, landing assistance rocket 110 may be a jet assisted takeoff, or JATO, unit. Depending on the type of rocket, upward thrust 112 may be varied by altering the reaction rate of the fuel within the rocket. Landing assistance rocket 110 may also be constructed to weigh less than a battery-powered backup motor for electric motor 104.

Referring to FIGS. 4A-4D in the drawings, a sequential landing scenario of quadcopter 200, which utilizes an assisted landing system, is depicted. In the illustrated embodiment, quadcopter 200 has four fan assemblies 202, 204, 206, 208, each of which include a motor, a landing assistance propulsion unit and fixed pitch fan blades. In FIG. 4A, the motor of fan assembly 202 has failed and can no longer power an upward thrust. Fan assemblies 204, 206, 208, meanwhile, are still functioning and provide upward thrusts 210, 212, 214, respectively. When the motor of fan assembly 202 fails, the flight control computer or pilot of quadcopter 200 initiates an emergency landing and underpowered descent of quadcopter 200 toward landing site 216, as shown in FIG. 4B. During the underpowered descent, the two fan assemblies that are off-axis from malfunctioning fan assembly 202, namely fan assemblies 204, 208, provide upward thrusts 210, 214 to prevent quadcopter 200 from freefalling. Upward thrusts 210, 214 may be any magnitude depending upon various factors, such as the weight, size or other characteristics of the particular rotorcraft. Fan assembly 206 includes fixed pitch fan blades and may rotate in either direction to provide either upward thrust 212 or downward thrust 218 to balance quadcopter 200 and prevent a rollover. At this stage of the underpowered descent, the landing assistance propulsion unit of malfunctioning fan assembly 202 is not yet engaged and therefore does not produce any thrust.

In FIG. 4C, quadcopter 200 is making a final landing approach toward landing site 216 and is performing a descent rate reduction maneuver. The descent rate reduction maneuver may be performed at any altitude above landing site 216, such as within 100 feet, 75 feet, 50 feet, 25 feet, 15 feet, 5 feet or any other distance from landing site 216. It will be appreciated by one of ordinary skill in the art that the altitude at which to perform the descent rate reduction maneuver may change from flight to flight based on gross weight, density altitude, wind, airspeed, amount of torque applied by the assisted landing system and other factors. During the descent rate reduction maneuver, the landing assistance propulsion unit of fan assembly 202 provides power to fan assembly 202 to produce upward thrust 220 for a particular duration. Fan assemblies 204, 206, 208 are simultaneously powered by their respective motors to provide upward balancing thrusts 210, 212, 214, respectively. The ability of quadcopter 200 to produce upward thrusts 210, 212, 214, 220 from all four of its fan assemblies 202, 204, 206, 208 during the descent rate reduction maneuver enables quadcopter 200 to land safely, thereby protecting the cargo, passengers and/or componentry of quadcopter 200. In some cases, the fan blade assembly of fan assembly 202 may be rotating in an opposite direction than normal before the landing assistance propulsion unit of fan assembly 202 is engaged. Thus, the landing assistance propulsion unit of fan assembly 202 may need to correct the rotation direction of the fan blade assembly when performing the descent rate reduction maneuver. In order to effectuate a safe landing, upward thrusts 210, 212, 214, 220 may be greater than the upward thrusts produced during non-emergency operations.

Because fan assembly 202 includes fixed pitch fan blades, the magnitude of upward thrust 220 may be controlled by the RPM of the fan blade assembly. Therefore, the rotational speed of the landing assistance propulsion unit of fan assembly 202 may be controllable to produce upward thrust 220 of a suitable magnitude to lower the descent rate of quadcopter 200 while also balancing thrusts 210, 212, 214. The descent rate reduction maneuver, during which the landing assistance propulsion unit of fan assembly 202 produces upward thrust 220, may last for any suitable amount of time to lower the descent rate of quadcopter 200, such as one minute, thirty seconds, ten seconds, five seconds, three seconds, one second or any other time period. While in the illustrated embodiment quadcopter 200 does not perform autorotation in the same manner as a helicopter, the descent rate reduction maneuver illustrated in FIG. 4C has a similar purpose to a flare recovery maneuver performed by a helicopter during autorotation in that it reduces the descent rate of quadcopter 200 just prior to landing on landing site 216. In FIG. 4D, quadcopter 200 has successfully lowered its descent rate to a safe level to land safely on landing site 216.

In some embodiments, the landing assistance propulsion unit of fan assembly 202 may be used more than once after the motor of fan assembly 202 fails. For example, the landing assistance propulsion unit of fan assembly 202 may be used for the first time at a high altitude, such as that illustrated in FIG. 4A or 4B, to bring quadcopter 200 from a high rate descent to a controlled descent. The landing assistance propulsion unit may then be used a second time during the final landing approach shown in FIG. 4C. In other embodiments, a rotorcraft may include landing assistance propulsion units that provide both takeoff and landing assistance. For example, if a rotor fails before or during takeoff, a landing assistance propulsion unit may provide a burst of upward thrust to advance the rotorcraft out of an undesirable height-velocity curve in which the rotor has insufficient kinetic energy for the rotorcraft to land safely. Takeoff assistance may be especially useful for rotorcraft taking off from an elevated platform, such as an oil rig or building. The additional kinetic energy provided by the landing assistance propulsion unit during takeoff may also help the rotorcraft to meet certification standards set forth by the U.S. Federal Aviation Administration. When the motor failure occurs during takeoff, the failure may be detected by a flight control computer or pilot, which then engages the landing assistance propulsion unit for the failed rotor. The flight control computer or pilot may re-engage the landing assistance propulsion unit during landing, thus providing multiple bursts of power for various operations of the rotorcraft.

While in the illustrated embodiment quadcopter 200 includes fixed pitch fan blades, the assisted landing system of the illustrative embodiments may be used by rotorcraft having variable pitch rotor blades. For such rotorcraft, the propulsion assembly that balances the malfunctioning propulsion assembly may adjust the pitch of its rotor blades to maintain balance of the rotorcraft. In addition, the collective control of the malfunctioning propulsion assembly may be adjusted to facilitate autorotation, such as by setting a negative collective pitch. When the descent rate reduction maneuver is performed by the rotorcraft, the pitch of the rotor blades of the malfunctioning propulsion assembly may change to a positive pitch while the landing assistance propulsion unit is activated to provide an upward thrust to soften the landing of the rotorcraft. While the landing assistance propulsion unit is engaged, the upward thrust may be adjusted by manipulating the collective control of the rotor blades instead of by varying the RPM of the rotor blades, thus allowing the RPM of the malfunctioning propulsion assembly to be less tightly controlled than for fixed pitch fan blades. In this way and others, autorotation may be utilized by rotorcraft having the assisted landing systems of the illustrative embodiments.

Figure 5A:
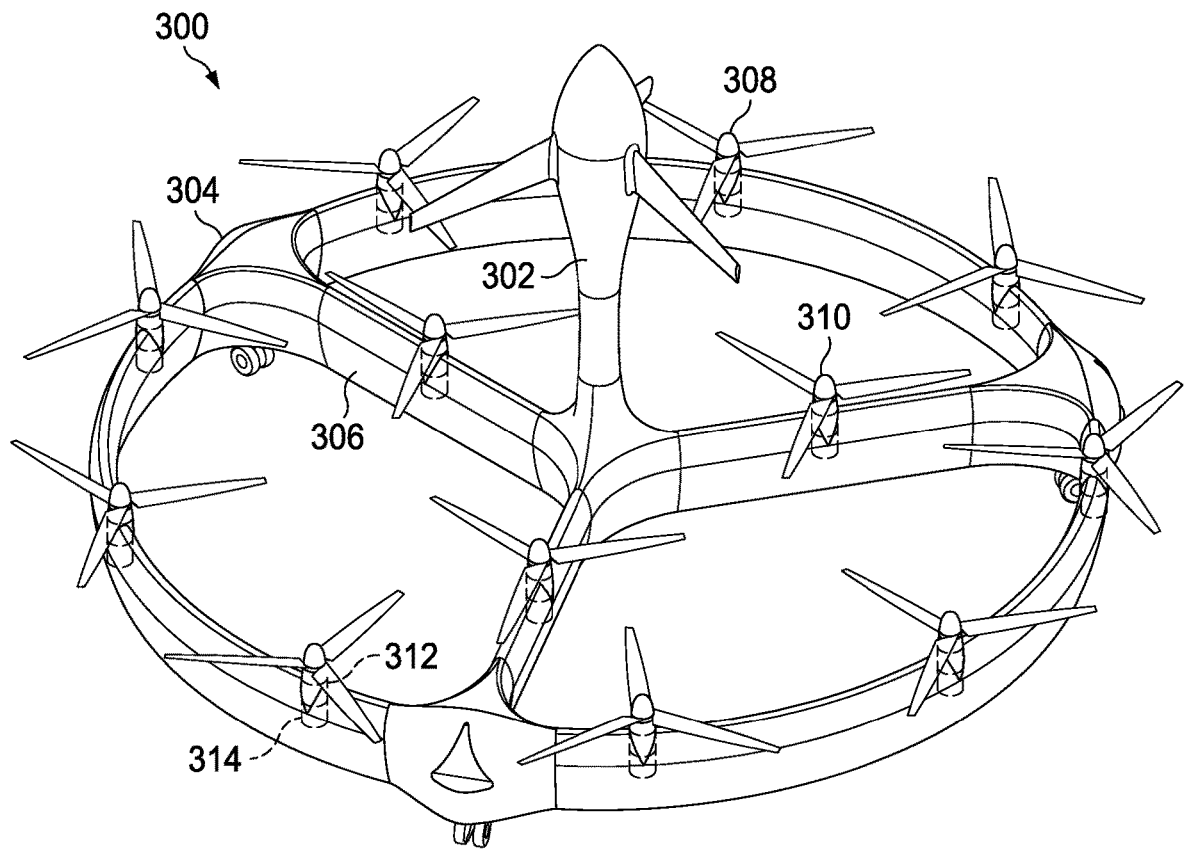
FIGS. 5A-5H are various views of different types of rotorcraft having an assisted landing system in accordance with embodiments of the present disclosure.
Figure 5B:
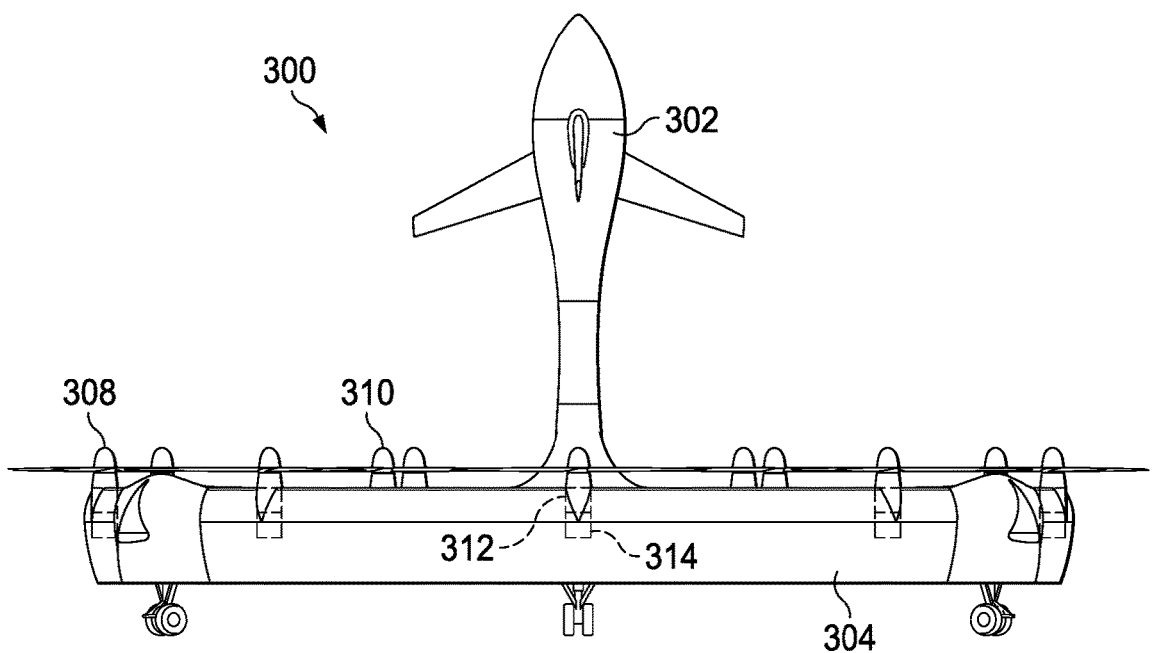

Referring to FIGS. 5A-5H in the drawings, various rotorcraft having assisted landing systems are depicted. The rotorcraft shown in FIGS. 5A-5H are representative of the wide variety of rotorcraft on which the assisted landing systems of the illustrative embodiments can be implemented. FIGS. 5A-5B illustrate a closed wing aircraft 300 including a fuselage 302 and a closed wing 304 supported by fuselage 302. Spokes 306 are interposed between fuselage 302 and closed wing 304. Closed wing aircraft 300 includes nine propulsion assemblies 308 rotatably coupled to closed wing 304 and three propulsion assemblies 310 rotatably coupled to spokes 306, although the number of propulsion assemblies may vary depending on the embodiment. Each propulsion assembly 308, 310 includes a motor 312 and a landing assistance propulsion unit 314. Each landing assistance propulsion unit 314 may act as a backup source of energy should motor 312 fail, helping to ensure that closed wing aircraft 300 has sufficient upward thrust to land safely if one of its propulsion assemblies 308, 310 fails.

Figure 5C:
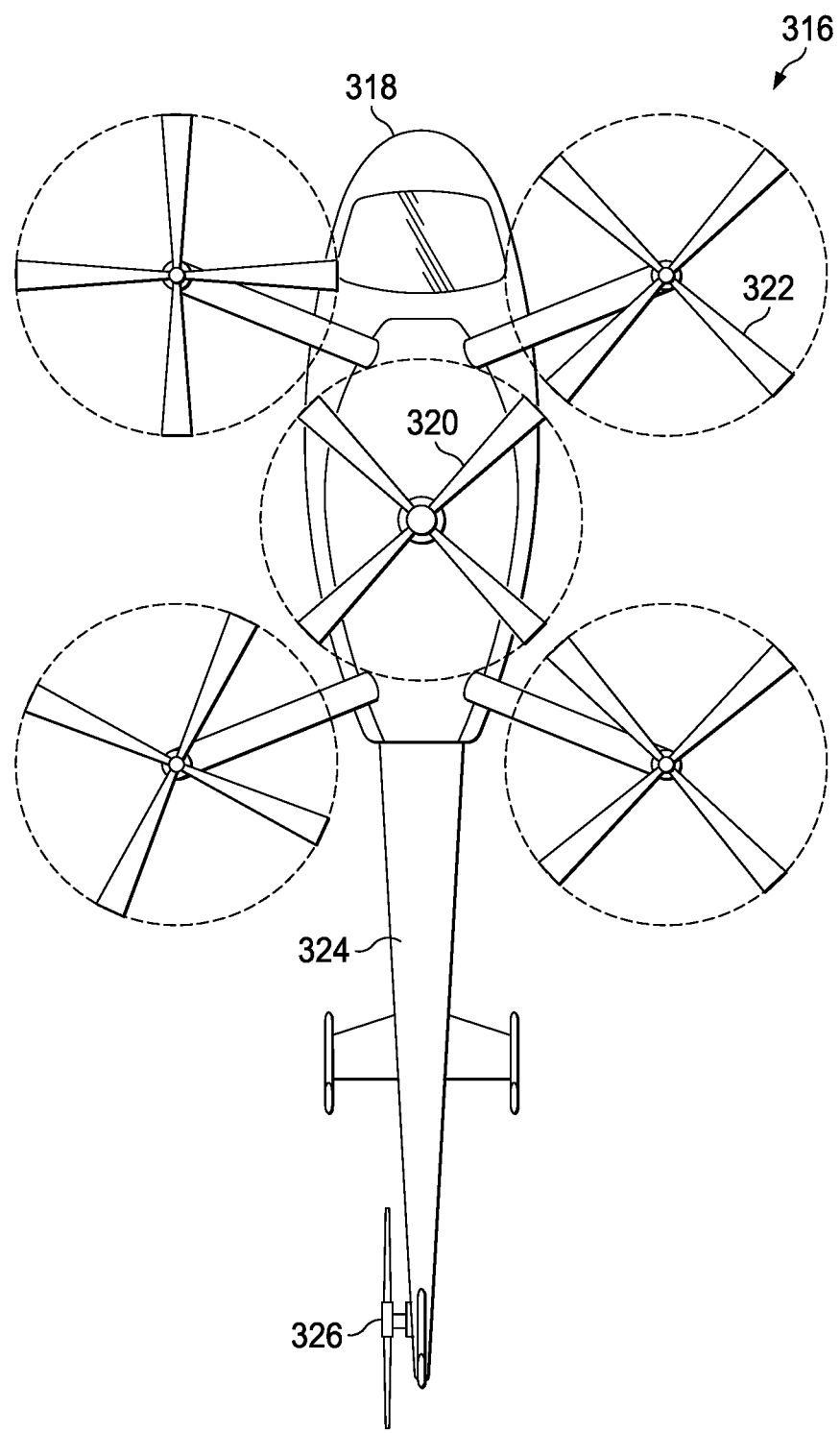

In FIG. 5C, rotorcraft 316 includes fuselage 318 to which a central rotor 320 and periphery rotors 322 are coupled. Central rotor 320 and periphery rotors 322 may have fixed or variable pitch rotor blades. Central rotor 320 and/or periphery rotors 322 may each include both a motor and a landing assistance propulsion unit. In other embodiments, central rotor 320 and/or periphery rotors 322 may each include a landing assistance propulsion unit while main power is provided to central rotor 320 and periphery rotors 322 by an interconnected drive system powered by one or more engines. Rotorcraft 316 also includes a tailboom 324 to which a tail rotor 326 is rotatably coupled. Tail rotor 326 may also include a landing assistance propulsion unit. Thus, if the motor or drive system powering tail rotor 326 fails, the landing assistance propulsion unit of tail rotor 326 may provide yaw control for rotorcraft 316.

Figure 5D:
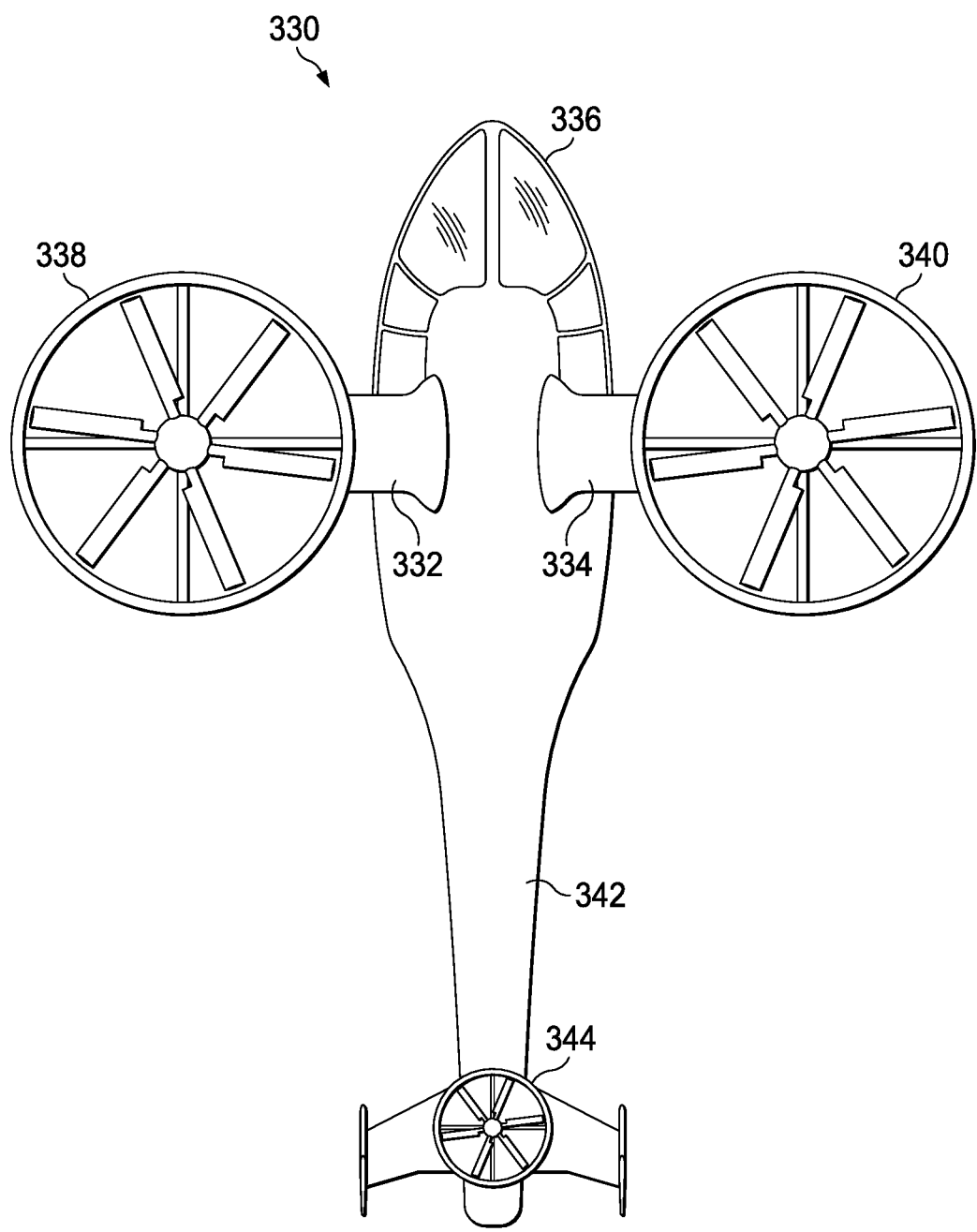

In FIG. 5D, rotorcraft 330 includes wings 332, 334 supported by fuselage 336. Ducted fan assemblies 338, 340 may be fixedly or rotatably coupled to wings 332, 334, respectively. Ducted fan assemblies 338, 340 may each have a motor and a landing assistance propulsion unit. Rotorcraft 330 includes tailboom 342 having a tail ducted fan assembly 344. Tail ducted fan assembly 344 includes a motor and a landing assistance propulsion unit, thereby allowing tail ducted fan assembly 344 to provide pitch control for rotorcraft 330 when tail ducted fan assembly 344 malfunctions. Ducted fan assemblies 338, 340 and tail ducted fan assembly 344 include fixed pitch fan blades. In other embodiments, ducted fan assemblies 338, 340 and tail ducted fan assembly 344 may be rotors that include variable pitch rotor blades. Such variable pitch rotor blades may be cyclically and/or collectively variable. In yet other embodiments, ducted fan assemblies 338, 340 and/or tail ducted fan assembly 344 may be powered by an interconnected drive system driven by an engine instead of having respective motors. In such embodiments, the landing assistance propulsion units of ducted fan assemblies 338, 340 and tail ducted fan assembly 344 may provide backup landing support should any portion of the interconnected drive system fail.

Figure 5E:
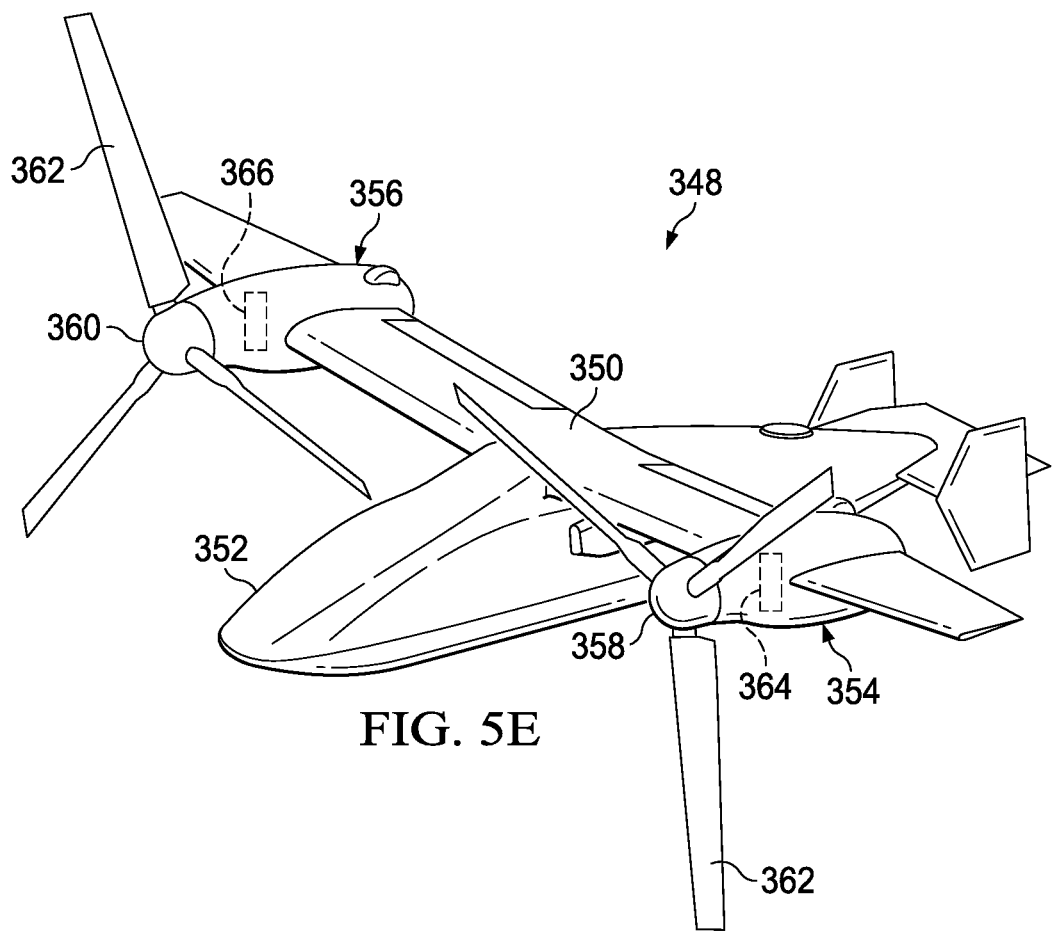
Figure 5F:
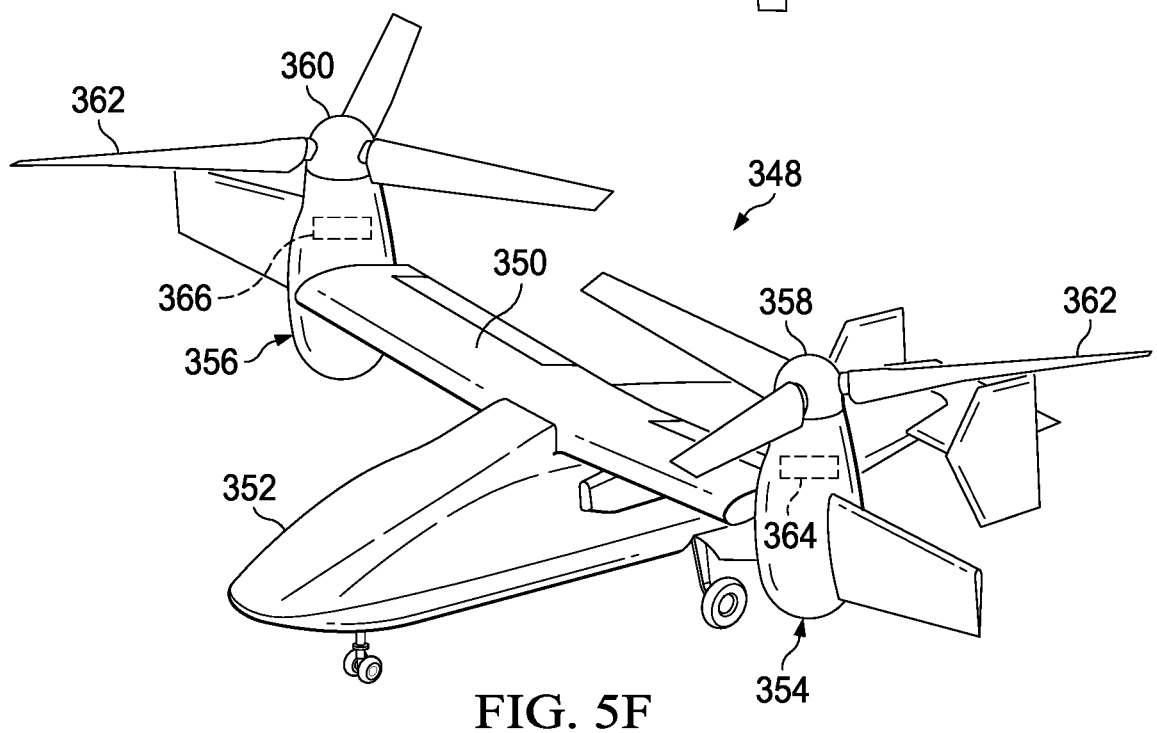

FIGS. 5E-5F depict tiltrotor aircraft 348 including wing 350 supported by fuselage 352. Coupled to outboard ends of wing 350 are pylon assemblies 354, 356. Pylon assembly 354 is rotatable relative to wing 350 between a generally horizontal orientation, as best seen in FIG. 5E, and a generally vertical orientation, as best seen in FIG. 5F. Pylon assembly 354 includes a proprotor assembly 358 that is rotatable responsive to torque and rotational energy provided by an engine, motor or other drive system. Likewise, pylon assembly 356 is rotatable relative to wing 350 between a generally horizontal orientation, as best seen in FIG. 5E, and a generally vertical orientation, as best seen in FIG. 5F. Pylon assembly 356 includes a proprotor assembly 360 that is rotatable responsive to torque and rotational energy provided by an engine, motor or other drive system. Proprotor assemblies 358, 360 each include proprotor blades 362. The position of pylon assemblies 354, 356, the angular velocity or RPM of proprotor assemblies 358, 360, the pitch of proprotor blades 362 and the like may be controlled by the pilot of tiltrotor aircraft 348 and/or a flight control system to selectively control the direction, thrust and lift of tiltrotor aircraft 348 during flight.

FIG. 5E illustrates tiltrotor aircraft 348 in a forward flight mode or airplane flight mode, in which proprotor assemblies 358, 360 are positioned to rotate in a substantially vertical plane and provide a forward thrust while a lifting force is supplied by wing 350 such that tiltrotor aircraft 348 flies much like a conventional propeller driven aircraft. FIG. 5F illustrates tiltrotor aircraft 348 in a vertical takeoff and landing (VTOL) flight mode or helicopter flight mode, in which proprotor assemblies 358, 360 are positioned to rotate in a substantially horizontal plane and provide a vertical thrust such that tiltrotor aircraft 348 flies much like a conventional helicopter. During operation, tiltrotor aircraft 348 may convert from helicopter flight mode to airplane flight mode following vertical takeoff and/or hover. Likewise, tiltrotor aircraft 348 may convert back to helicopter flight mode from airplane flight mode for hover and/or vertical landing. In addition, tiltrotor aircraft 348 can perform certain flight maneuvers with proprotor assemblies 358, 360 positioned between airplane flight mode and helicopter flight mode, which can be referred to as conversion flight mode.

In the illustrated embodiment, proprotor blades 362 are variable pitch rotor blades that may have cyclical and/or collective control. Proprotor assemblies 358, 360 may be powered in a number of ways. For example, each pylon assembly 354, 356 may include a respective motor or engine. In other embodiments, proprotor assemblies 358, 360 may be driven by an interconnected drive system powered by an engine located in fuselage 352. Each pylon assembly 354, 356 may include a landing assistance propulsion unit 364, 366 that provides backup landing support should either or both of proprotor assemblies 358, 360 fail. By way of example, if tiltrotor aircraft 348 is attempting to land in helicopter flight mode while a motor, engine or transmission driving proprotor assembly 358 fails, landing assistance propulsion unit 364 may provide backup power to proprotor assembly 358 to enable tiltrotor aircraft 348 to land safely.

Figure 5G:
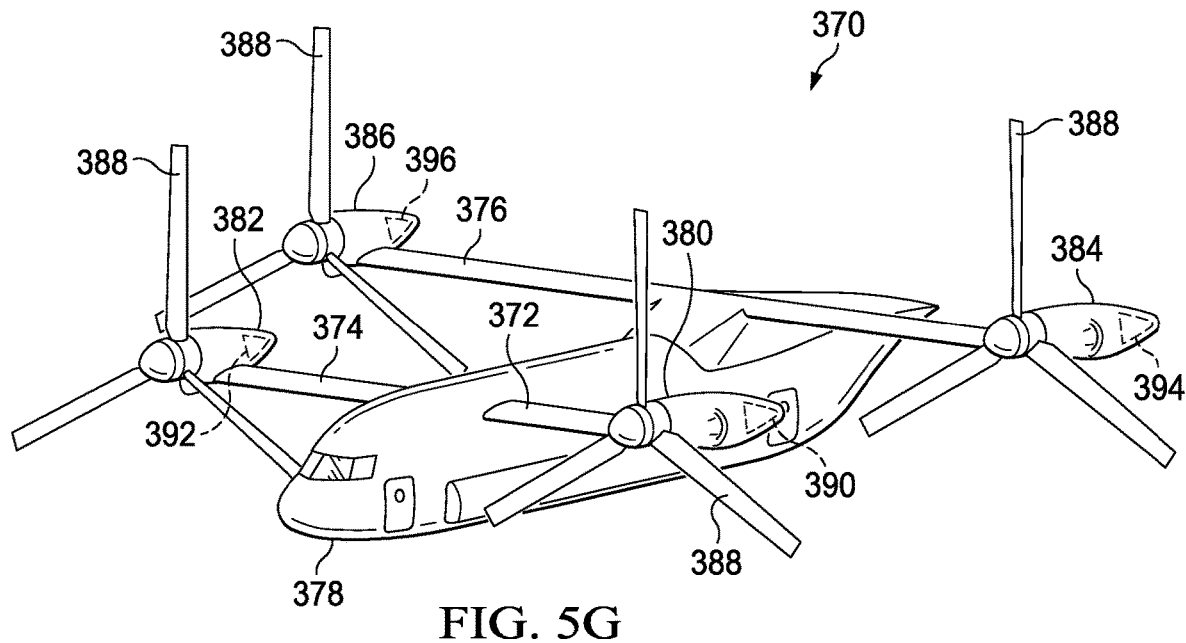
Figure 5H:
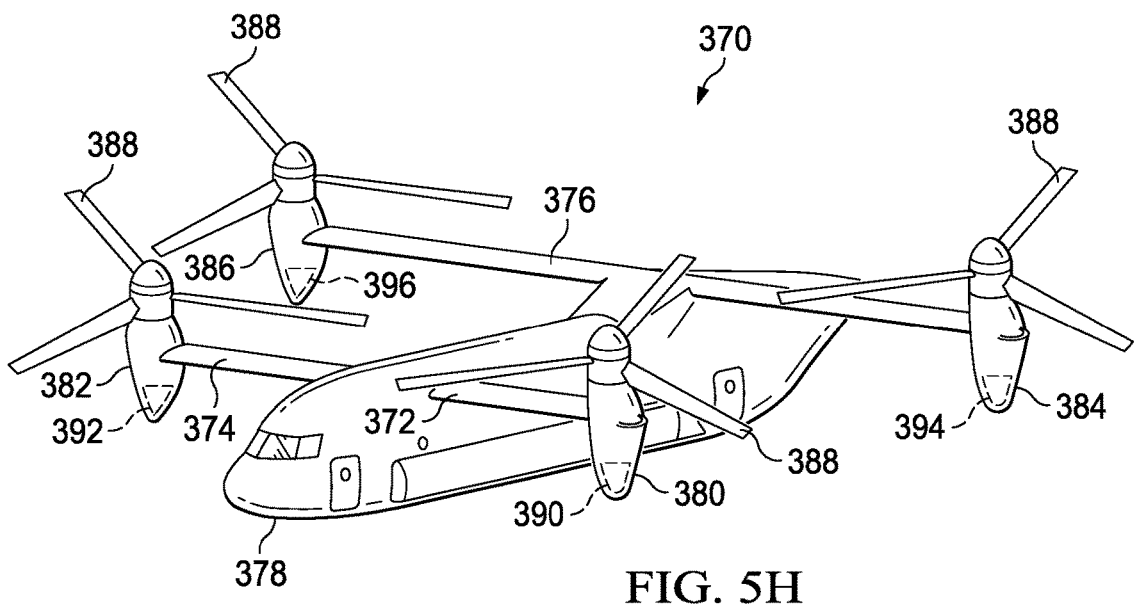

FIGS. 5G-5H depict tiltrotor aircraft 370 including forward wings 372, 374 and aft wing 376 supported by fuselage 378. Pylon assemblies 380, 382 are rotatably coupled to the outboard ends of forward wings 372, 374, respectively. Pylon assemblies 384, 386 are rotatably coupled to the outboard ends of aft wing 376. Proprotor blades 388 of pylon assemblies 380, 382, 384, 386 are variable pitch proprotor blades having cyclical and/or collective control. Pylon assemblies 380, 382, 384, 386 may each include an independent motor or engine, although in other embodiments an interconnected drive system may drive proprotor blades 388. Each pylon assembly 380, 382, 384, 386 includes a landing assistance propulsion unit 390, 392, 394, 396, respectively. Landing assistance propulsion units 390, 392, 394, 396 provide backup landing support should one of pylon assemblies 380, 382, 384, 386 fail. The landing assistance propulsion units of the illustrative embodiments may be used in a wide variety of rotorcraft having any size, shape, configuration, number of rotors, type of rotor blades or other physical characteristics.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft, the propulsion assembly comprising:
   a blade assembly;
   a drive shaft coupled to the blade assembly;
   an electric motor coupled to the drive shaft and operable to provide rotational energy to the drive shaft to rotate the blade assembly; and
   a landing assistance turbine including a solid fuel chamber adapted to contain a solid fuel, an oxidant chamber adapted to contain an oxidant and a throttle operable to selectively release the oxidant for combustion with the solid fuel, the landing assistance turbine coupled to the drive shaft and operable to selectively provide rotational energy to the drive shaft during an underpowered descent to rotate the blade assembly and provide upward thrust, thereby reducing a descent rate of the rotorcraft prior to landing.

2. The propulsion assembly as recited in claim 1 wherein the blade assembly further comprises a fan blade assembly including a plurality of fixed pitch fan blades.

3. The propulsion assembly as recited in claim 1 wherein the blade assembly further comprises a rotor blade assembly including a plurality of variable pitch rotor blades.

4. The propulsion assembly as recited in claim 1 wherein the electric motor is interposed between the blade assembly and the landing assistance turbine, the electric motor and the landing assistance turbine forming a stacked arrangement.

5. The propulsion assembly as recited in claim 1 wherein the landing assistance turbine further comprises a single use landing assistance turbine.

6. The propulsion assembly as recited in claim 1 wherein the landing assistance turbine is adapted to provide the upward thrust for a duration between 1 and 10 seconds.

7. The propulsion assembly as recited in claim 1 wherein the drive shaft further comprises a clutch interposed between the electric motor and the landing assistance turbine.

8. The propulsion assembly as recited in claim 1 wherein the solid fuel and the oxidant are replaceable after use.

9. The propulsion assembly as recited in claim 1 wherein the throttle is operable to vary the release of oxidant in response to input from a flight control computer.

10. The propulsion assembly as recited in claim 1 wherein the throttle is operable to vary the release of oxidant in response to input from a pilot of the rotorcraft.

11. The propulsion assembly as recited in claim 1 wherein the underpowered descent of the rotorcraft is caused by at least partial failure of the electric motor.

12. The propulsion assembly as recited in claim 1 wherein the landing assistance turbine further comprises a combustion chamber to contain a combustion reaction, the combustion reaction producing exhaust and wherein the landing assistance turbine further comprises an exhaust subsystem to release the exhaust.

13. The propulsion assembly as recited in claim 1 further comprising a nacelle at least partially containing the drive shaft, the electric motor and the landing assistance turbine.

14. A rotorcraft comprising:
a fuselage; and
a plurality of propulsion assemblies coupled to the fuselage, each propulsion assembly including:
a blade assembly;
a drive shaft coupled to the blade assembly;
an electric motor coupled to the drive shaft and operable to provide rotational energy to the drive shaft to rotate the blade assembly; and
a landing assistance turbine including a solid fuel chamber adapted to contain a solid fuel, an oxidant chamber adapted to contain an oxidant and a throttle operable to selectively release the oxidant for combustion with the solid fuel, the landing assistance turbine coupled to the drive shaft and operable to selectively provide rotational energy to the drive shaft during an underpowered descent to rotate the blade assembly and provide upward thrust, thereby reducing a descent rate of the rotorcraft prior to landing.

15. The rotorcraft as recited in claim 14 wherein at least one of the plurality of propulsion assemblies is subject to a malfunction caused by a failure of the electric motor;
wherein the non-malfunctioning propulsion assemblies in the plurality of propulsion assemblies provide upward thrust during the underpowered descent; and
wherein the landing assistance turbine of the malfunctioning propulsion assembly is adapted to provide upward thrust during a descent rate reduction maneuver prior to landing to safely land the rotorcraft.

16. The rotorcraft as recited in claim 14 wherein the rotorcraft is a quadcopter.

17. The rotorcraft as recited in claim 14 further comprising one or more wings supported by the fuselage.

18. The rotorcraft as recited in claim 14 further comprising a closed wing supported by the fuselage.

19. The rotorcraft as recited in claim 14 wherein each of the propulsion assemblies is a ducted fan assembly.

20. The rotorcraft as recited in claim 14 wherein the rotorcraft is a tiltrotor aircraft.

* * * * *